(12) United States Patent
Szalko et al.

(10) Patent No.: US 10,118,656 B2
(45) Date of Patent: Nov. 6, 2018

(54) ARTICULATED MACHINE EMPLOYING STABILIZERS AND STEERING INTERLOCK

(71) Applicant: Caterpillar Global Mining America LLC, Houston, TX (US)

(72) Inventors: James Robert Szalko, Lacon, IL (US); Patrick W. Sullivan, Orland Park, IL (US); Rex Glover, Deer Creek, IL (US); Justin B. Eaton, Plainfield, IL (US); Paul A. Dvorak, Peoria, IL (US)

(73) Assignee: Caterpillar Global Mining LLC, Tucson, AZ (US)

( * ) Notice: Subject to any disclaimer, the term of this patent is extended or adjusted under 35 U.S.C. 154(b) by 501 days.

(21) Appl. No.: 14/987,485

(22) Filed: Jan. 4, 2016

(65) Prior Publication Data
US 2017/0190356 A1    Jul. 6, 2017

(51) Int. Cl.
*B62D 53/02* (2006.01)
*B62D 12/00* (2006.01)
*E21B 7/02* (2006.01)
*B62D 5/06* (2006.01)
*B62D 21/18* (2006.01)
*E02F 9/08* (2006.01)
*B60S 9/10* (2006.01)

(52) U.S. Cl.
CPC ............... *B62D 53/02* (2013.01); *B62D 5/06* (2013.01); *B62D 12/00* (2013.01); *B62D 21/186* (2013.01); *E02F 9/085* (2013.01); *E21B 7/024* (2013.01); *E21B 7/025* (2013.01); *B60S 9/10* (2013.01)

(58) Field of Classification Search
CPC .......... B62D 12/02; B62D 12/00; B62D 5/07; E02F 9/085; B60S 9/10; B60S 9/12
See application file for complete search history.

(56) References Cited

U.S. PATENT DOCUMENTS 3,650,346 A    3/1972  Desmarais et al.
3,744,574 A    7/1973  Carley

*Primary Examiner* — Kevin Hurley
(74) *Attorney, Agent, or Firm* — Miller, Matthias & Hull

(57) ABSTRACT

A machine includes a front section having front wheels, a rear section having rear wheels, and a pivot that couples the front section to the rear section as well as a hydraulic steering circuit that moves the front section relative to the rear section about the pivot. The machine also includes a stabilizer and further includes a directional control valve that selectively depressurizes the hydraulic steering circuit according to a state of the stabilizer.

20 Claims, 7 Drawing Sheets

ARTICULATED MACHINE EMPLOYING STABILIZERS AND STEERING INTERLOCK

TECHNICAL FIELD

The present disclosure generally relates to work machines and, more particularly, relates to articulated machines employing stabilizers.

BACKGROUND

Many work machines used in the earth-moving, mining, construction, and agricultural industries use stabilizers to raise the wheels of the machine off the ground when performing an operation. Some of these machines are also articulated in that they include a forward section having front wheels pivotally connected to a rear section having rear wheels. Steering is accomplished by articulating the machine in the middle between the front section and the rear section to change the relationship between the front wheels and the rear wheels.

One example of such a machine is a drill jumbo. A drill jumbo is a self-propelled drilling machine that is used to drill holes in a mining environment. While effective for mining operations, when the stabilizers are employed with such articulated machines, the steering capability of the machine remains active. As the machine has enough steering force to steer the machine while on stabilizers, this can cause damage to the machine and/or stabilizers in such a state.

U.S. Pat. No. 3,744,574 (the '574 patent) discloses an articulated machine with a rock drilling unit mounted on a front section of the articulated machine. A ground engaging stabilizer holds the drilling unit and contacts the ground when the drilling unit is operated. Because the drilling unit is mounted to the ground engaging stabilizer, vibration and shock from the drilling unit are transmitted to the ground rather than through the machine body. The '574 patent uses the ground engaging stabilizer as a blade to remove rubble and thereby encourages movement of the machine while the stabilizer is engaged. A machine in accordance with the '574 patent necessarily steers the machine while the ground engaging stabilizer is in contact with the ground. Earth built up during use of the blade can damage the drill if the drill is fully or partially deployed.

SUMMARY OF THE DISCLOSURE

In accordance with one aspect of the disclosure, a machine includes a front section having a pair of front wheels, a rear section having a pair of rear wheels, a pivot that couples the front section to the rear section, and a hydraulic steering circuit that moves the front section relative to the rear section about the pivot. The machine also includes a stabilizer and a directional control valve that selectively depressurizes the hydraulic steering circuit according to a state of the stabilizer.

In accordance with another aspect of the disclosure, a steering interlock system in a machine includes a pump that supplies pressurized hydraulic fluid, a hydraulic stabilizer circuit and a hydraulic steering circuit. The hydraulic stabilizer circuit includes a stabilizer cylinder coupled to the pump and a stabilizer coupled to the stabilizer cylinder, the stabilizer operated between a stowed state and a unstowed state by the stabilizer cylinder. The hydraulic steering circuit includes a steering cylinder coupled to the pump, the steering cylinder configured to cause the machine to change a steering angle, and a directional control valve coupled between the pump and the steering cylinder, the directional control valve configured to selectively depressurize the hydraulic steering circuit responsive to the stabilizer being in the stowed state or the unstowed state.

In yet another aspect of the disclosure, a method of operating a machine that includes a stabilizer includes determining a state of the stabilizer to be in one of a stowed state and a unstowed state, enabling a steering system of the machine when the stabilizer system is in the stowed state, and disabling the steering system of the machine when the stabilizer system is in the unstowed state.

These and other aspects and features will be more readily understood when reading the following detailed description and taken in conjunction with the accompanying drawings.

DETAILED DESCRIPTION

Figure 1:
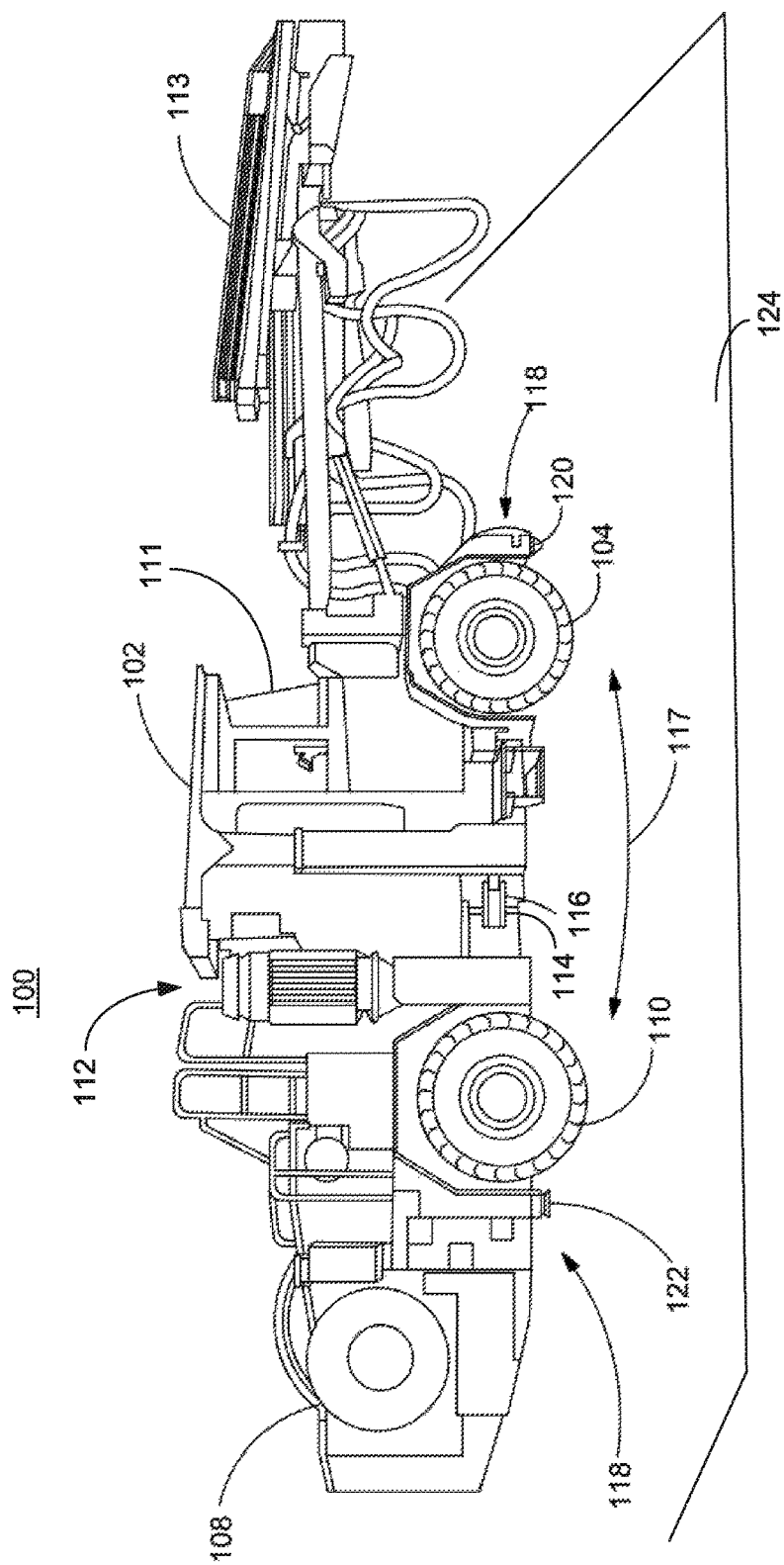
FIG. 1 is a side view of a machine in accordance with the current disclosure.
Figure 2:
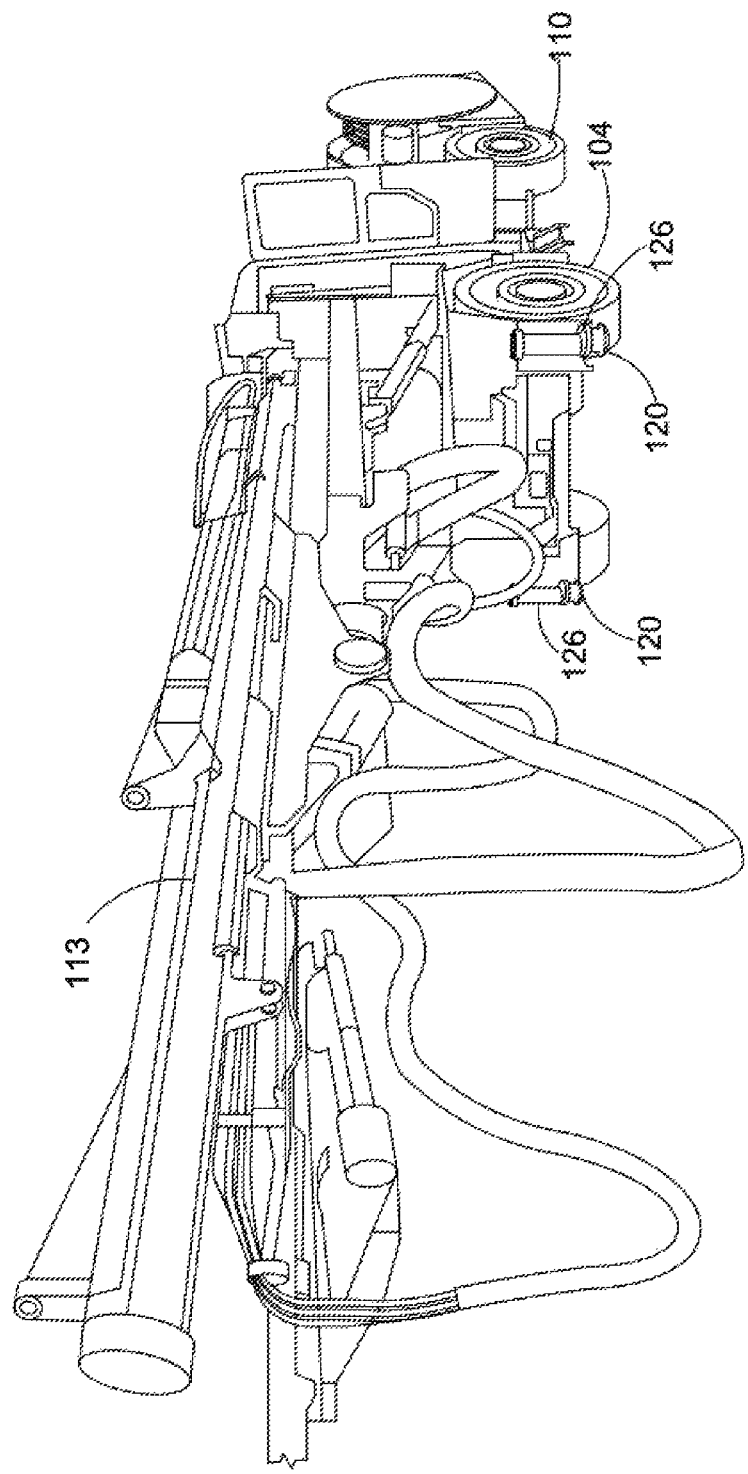
FIG. 2 is a perspective view of the machine of FIG. 1.

Referring now to the drawings, and with specific reference to FIGS. 1 and 2, a machine constructed in accordance with the present disclosure is generally referred to be reference number 100. While the machine 100 depicted in FIG. 1 is a self-propelled drill sometimes referred to as a drill jumbo suitable for use in mining operations it is to be understood that the teachings of the present disclosure are not limited to such drill jumbos, but can be used in connection with many other machines as described below. The machine 100 includes a front section 102 with front wheels 104 and a rear section 108 with rear wheels 110. The front section 102 may include an operator station 111, while the rear section 108 may include an engine or other prime mover 112. The machine 100 may also include an implement 113 extending from the front section 102. In this exemplary embodiment, the implement 113 is a drill that may be used for drilling holes on any angle from vertical to horizontal, but of course other implements or other types of articulated machines are possible.

The machine 100 may be articulated, that is, the front section 102 is coupled to the rear section 108 at a pivot 114. When the machine 100 is being moved, or trammed, steering is accomplished by changing a steering angle 117 between the front section 102 and the rear section 108 using a steering cylinder 116. A stabilizer system 118 uses a front stabilizer 120 and a rear stabilizer 122 to engage the ground 124 for leveling and stability during drill operations. In one embodiment, the front stabilizer 120 and the rear stabilizer 122 may be mounted to outriggers (not depicted) that extend beyond the front wheels 104 and the rear wheels 110, respectively, to provide a more stable base when the implement 113 is in use. Corresponding stabilizers would also typically be disposed on the side of the machine 100 not depicted in FIG. 1.

Another view of the machine 100 is shown in FIG. 2. This front perspective view shows another front stabilizer 120 as well as a stabilizer cylinder 126 coupled to each respective front stabilizer 120. As shown in FIG. 1 and FIG. 2, the front stabilizer 120 and the rear stabilizer 122 are fully retracted and in a stowed state 128. For the purpose of the discussion that follows, if the front stabilizer 120, the rear stabilizer 122, or both, are either partially or fully deployed, they are in a unstowed state 130 (illustrated below in FIG. 4). When the front stabilizer 120, the rear stabilizer 122, or both, are fully deployed and in contact with the ground 124 that is merely one example of the unstowed state 130. Moreover, as alluded to above, while the machine 100 in this exemplary embodiment is a drill jumbo, the techniques described herein may be applicable to other machines that use stabilizers and which have steering controls that may cause a chassis of the machine to change positions while the stabilizers are deployed, such as a backhoe loader, excavator, and the like.

With prior art approaches, a problem may occur when the machine 100 has either or both the front stabilizer 120 and the rear stabilizer 122 deployed and in contact with the ground 124. In this situation, if an operator issues a steering command, the machine 100 will attempt to change its steering angle 117 by rotating the front section 102 relative to the rear section 108 about the pivot 114. Because virtually the full weight of the machine 100 may be carried between the front stabilizer 120 and the rear stabilizer 122 (and their opposite side counterparts) the twisting motion of the machine 100 about the pivot 114 can damage the front stabilizer 120, the rear stabilizer 122, or both.

In order to mitigate such damage, the present disclosure employs a steering interlock system 131. The steering interlock system 131 prevents motion in the steering cylinder 116 when either or both of the front stabilizer 120 or rear stabilizer 122 are in a unstowed state 130. However, in order to give an operator more control to allow tramming, for example, for a short move, an override may be provided that allows steering control even when in the unstowed state 130, as discussed in more detail below.

Figure 3:
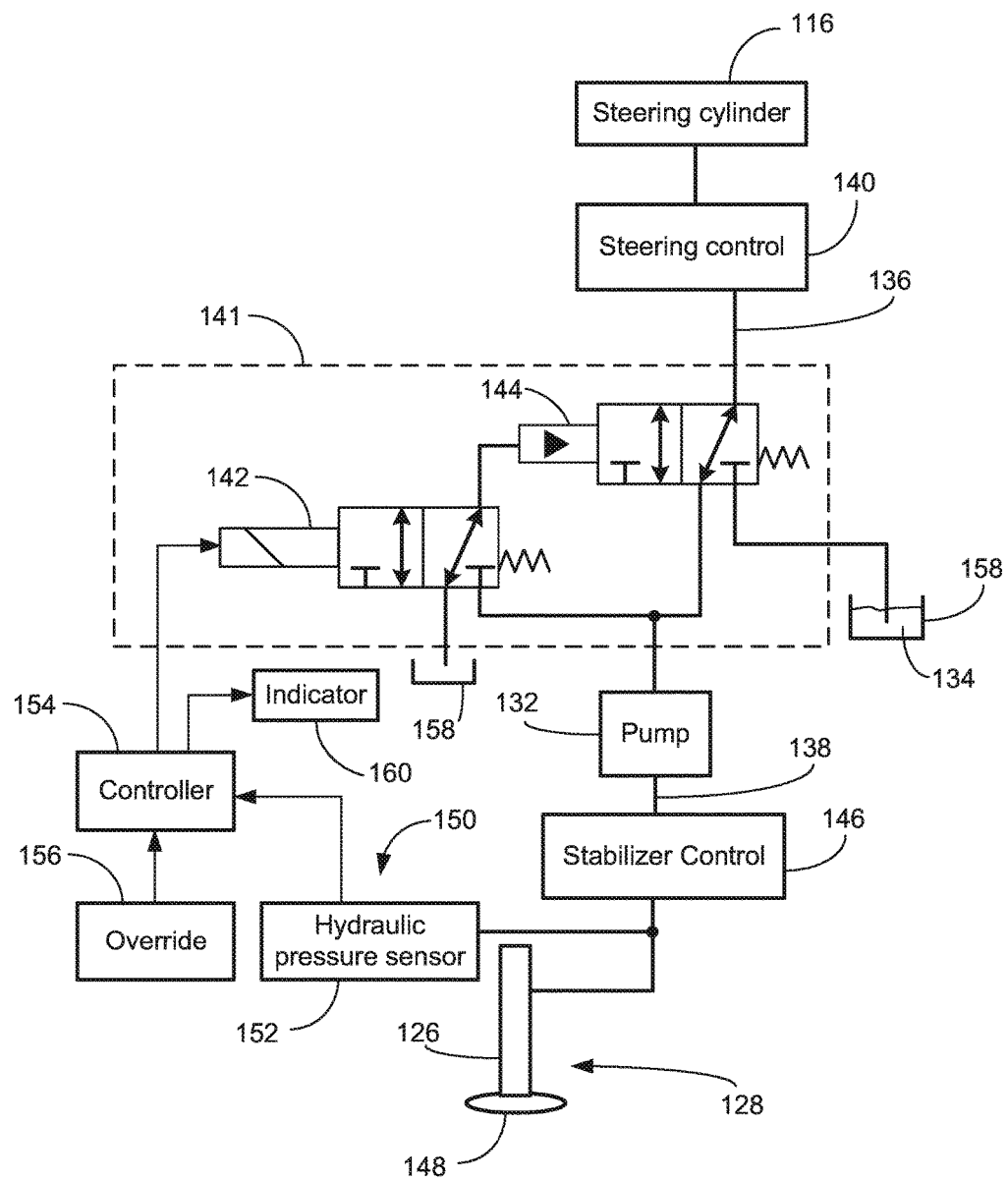
FIG. 3 is a schematic illustration of elements for providing a steering interlock for the machine of FIG. 1 in a first operating state.
Figure 4:
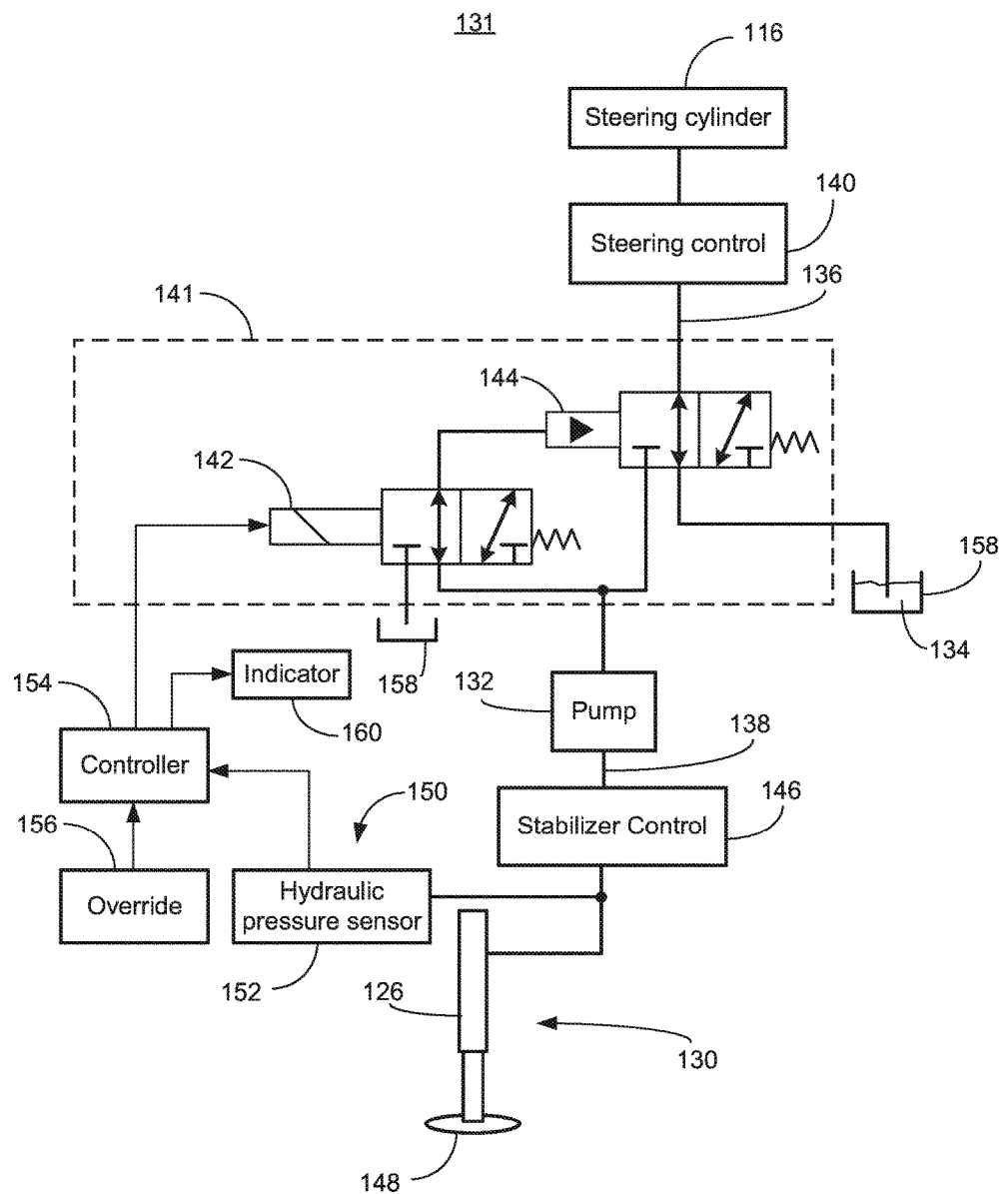
FIG. 4 is a schematic illustration of elements for providing a steering interlock for the machine of FIG. 1 in another operating state.

FIGS. 3 and 4 schematically illustrate relevant elements of a steering interlock system 131 for the machine 100 in different states of operation. Starting with FIG. 3, an exemplary configuration that provides for normal steering is depicted. A pump 132 provides hydraulic fluid 134 under pressure to a hydraulic steering circuit 136 and to a hydraulic stabilizer circuit 138. The hydraulic steering circuit 136 includes a steering control 140 and the steering cylinder 116. In one embodiment, the hydraulic steering circuit 136 also may include a directional control valve 141 that may include a first valve 142 and a second valve 144 that are discussed in more detail below. This configuration of directional control valve 141 may be known as a dual stage electrohydraulic directional valve.

The hydraulic stabilizer circuit 138 may also include a stabilizer control 146 that manages extension and retraction of the stabilizer cylinder 126 in order to cause, for example, a stabilizer 148 to engage the ground 124 or retract to the stowed state 128. The stabilizer 148 is depicted in FIG. 3 in the stowed state 128. For simplicity of illustration, the stabilizer 148 is the only stabilizer shown. The stabilizer 148 is representative of either front stabilizer 120 or either rear stabilizer 122. In operation, and as defined herein, if any stabilizer in the machine 100 is partially or fully deployed, an unstowed state 130 exists. The hydraulic stabilizer circuit 138 may also include a stabilizer sensor 150 that is used to determine if the stabilizer 148 is in a stowed state 128 or a unstowed state 130. In this embodiment, the stabilizer sensor 150 is a hydraulic pressure sensor 152, but other types of sensors are possible.

The steering interlock system 131 may further include a controller 154 may receive data from the stabilizer sensor 150 in order to determine whether the stabilizer 148 is in the stowed state 128 or the unstowed state 130. An override circuit 156 may be used in the steering interlock system 131 to allow steering control even when the controller 154 senses a unstowed state 130 in the stabilizer 148. The controller 154 may be a processor-based electronic controller with analog-to-digital inputs and digital-to-analog outputs or may be a hydraulic system using pressure activated controls. In another embodiment, the controller 154 may be part of a mixed electrohydraulic system that uses a combination of electrical and hydraulic pressure sensors as well as hydraulic and electrohydraulic valves. In one embodiment, the controller 154 may be part of an engine controller, body controller, implement controller, or other existing controller.

In operation, when the stabilizer 148 is in the stowed state 128, the stabilizer sensor 150 reports data to the controller 154 that may be used to determine that the stabilizer 148 is in the stowed state 128. The controller 154 sends a signal to the first valve 142 that places the first valve 142 in the default, or open, state, as shown in FIG. 3. In an embodiment where the stabilizer sensor 150 is a hydraulic pressure sensor 152, the controller 154 may observe a pressure spike in the hydraulic stabilizer circuit 138 that indicates the stabilizer cylinder 126 is in a fully retracted position. The override circuit 156 is discussed more below and is assumed in this illustration to be cleared, that is, inactive. A tank 158 provides unpressurized storage for the hydraulic fluid 134 used in the machine 100.

With the first valve 142 in the default state, hydraulic fluid 134 from pump 132 is blocked from reaching the second valve 144 and any hydraulic fluid 134 under pressure acting on the second valve 144 is drained to tank 158 so that the second valve 144 is in a default position. With the second valve 144 in such a default position, hydraulic fluid 134 from the pump 132 flows to the steering control 140 to adjust the steering cylinder 116 so that the machine 100 may be steered by changing the steering angle 117. The first valve 142 is in a default state so that in a failsafe situation, where a failure may occur in or around the stabilizer sensor 150 or the controller 154, steering remains enabled. In this embodiment, the second valve 144 that is operated hydraulically allows the first valve 142 to be smaller than if an electrohydraulic valve used between the pump 132 and steering control 140.

An indicator 160 may be used to alert an operator to a state of the stabilizer 148 as stowed or unstowed, which in turn indicates the state of the hydraulic steering circuit 136, such as steering enabled or steering disabled, respectively. The indicator 160 may be a separate light, an audible indicator, a dashboard light, a field on an operator display, or some combination of these. In one embodiment, the indicator 160 may indicate whether steering is enabled or disabled in addition to or instead of indicating the state of the stabilizer 148.

FIG. 4 shows the embodiment of FIG. 3 with the stabilizer 148 in the unstowed state 130. In such an embodiment, the controller 154 determines, via the stabilizer sensor 150, that the stabilizer 148 is in the unstowed state 130 and activates the first valve 142 to the state shown in FIG. 4. Hydraulic fluid 134 flows from the pump 132 through the first valve 142 and moves the second valve 144 so that the pump is disconnected from the steering control 140 and the hydraulic steering circuit 136 is depressurized and drained to the tank 158. In this state, any attempt to steer the machine 100 will be ineffective. The indicator 160 may be de-activated so that the operator is aware that the stabilizer 148 is in the unstowed state 130, which in turn indicates steering is disabled.

Figure 5:
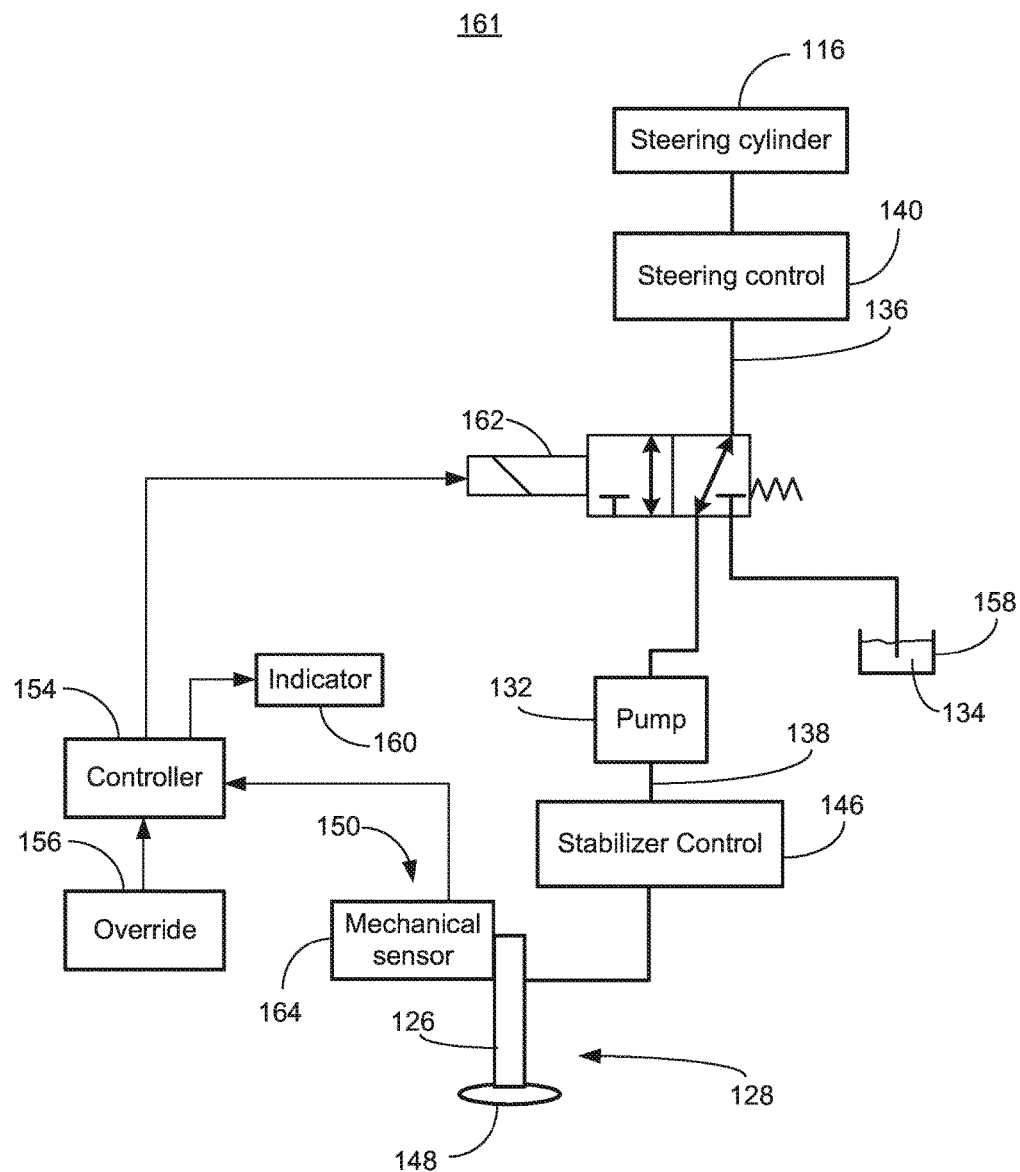
FIG. 5 is a schematic illustration of elements for providing an alternate embodiment of a steering interlock for the machine of FIG. 1.

An alternate embodiment of a steering interlock system 161 is illustrated in FIG. 5. In this embodiment, the controller 154 is directly coupled to a directional control valve 162, or more specifically, a direct acting directional control valve, such as an electrohydraulic valve. In this embodiment, even though the directional control valve 162 may be relatively large compared to the first valve 142 of FIGS. 3 and 4, the use of a single valve reduces the overall parts count of the machine 100 and may be simpler for servicing. Also in this embodiment, a sensor 164 is used as the stabilizer sensor 150. The sensor 164 may use a switch or pressure sensor (not depicted) to determine when either the stabilizer cylinder 126 or the stabilizer 148 itself is in the stowed state 128. In this embodiment, the controller 154 reads the state of the sensor 164 and uses that to determine whether the stabilizer 148 is in a stowed state 128 or the unstowed state 130. The controller 154 then sends a signal that activates the directional control valve 162 to depressurize the hydraulic steering circuit 136 by connecting it to the tank 158.

Figure 6:
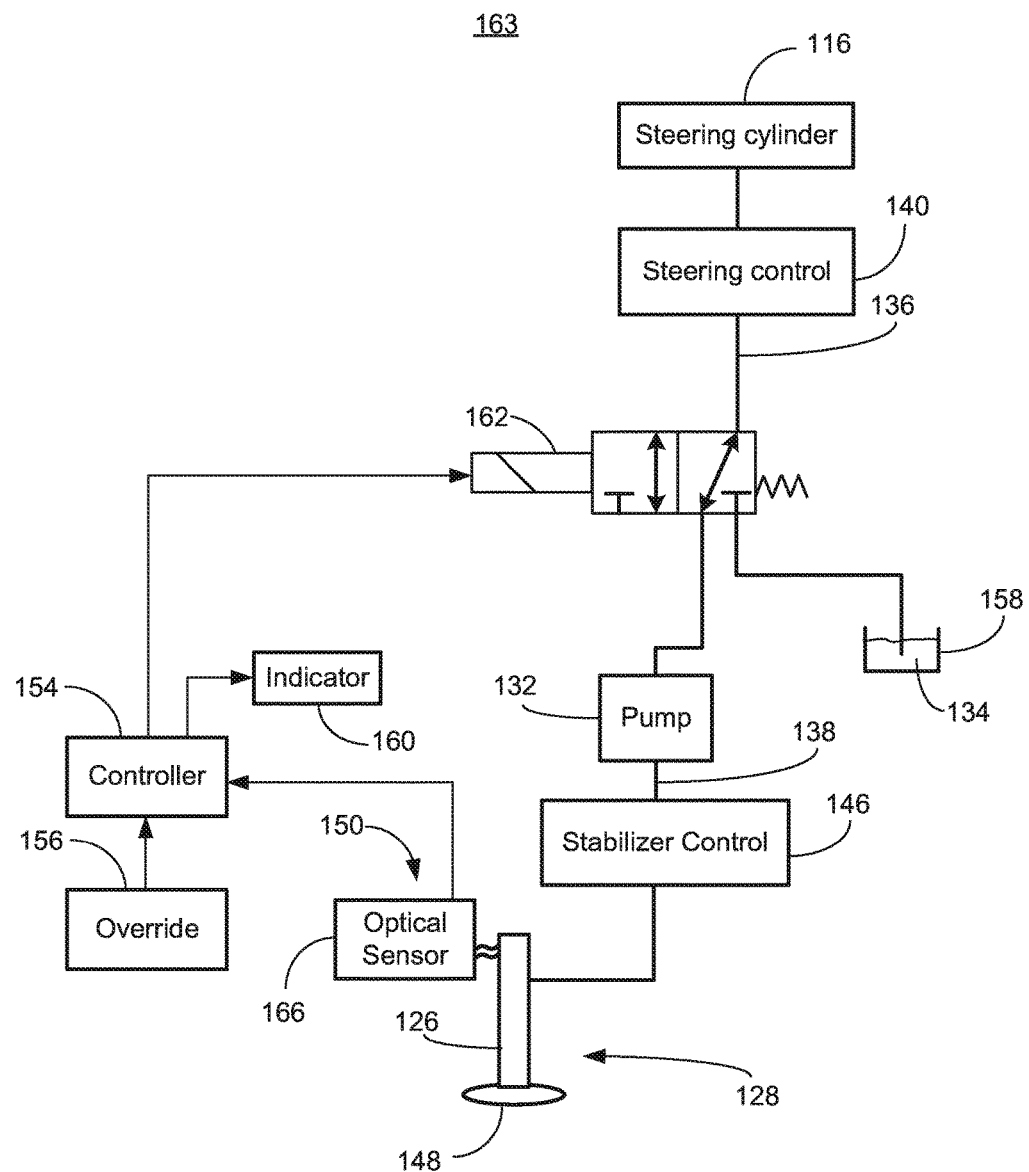
FIG. 6 is schematic illustration of elements for providing an yet another alternate embodiment of a steering interlock for the machine of FIG. 1.

FIG. 6 depicts yet another alternative embodiment of a steering interlock system 163 similar to the embodiment of FIG. 5. In this embodiment, an optical sensor 166 is used as the stabilizer sensor 150. The optical sensor 166 may be sealed in the stabilizer 148 to protect the optical sensor 166 from dirt or grime that would potentially impede its performance. In this embodiment, the controller 154 uses an output of the optical sensor 166 to determine whether the stabilizer 148 is fully retracted and in the stowed state 128. Although this embodiment also uses the directional control valve 162 illustrated in FIG. 5, it should be noted that the choice of stabilizer sensor 150 is independent of the hydraulic valve scheme illustrated in FIGS. 3 and 4 or FIGS. 5 and 6. Any type of stabilizer sensor 150 is suitable for operation with either hydraulic valve scheme.

INDUSTRIAL APPLICABILITY

In general, the present disclosure may find applicability in many industries, including but not limited to earthmoving, construction, agriculture, transportation, forestry, and marine industries and may include machines including, but not limited to a drill jumbo, excavators and other equipment that uses stabilizers during operation of an implement.

Figure 7:
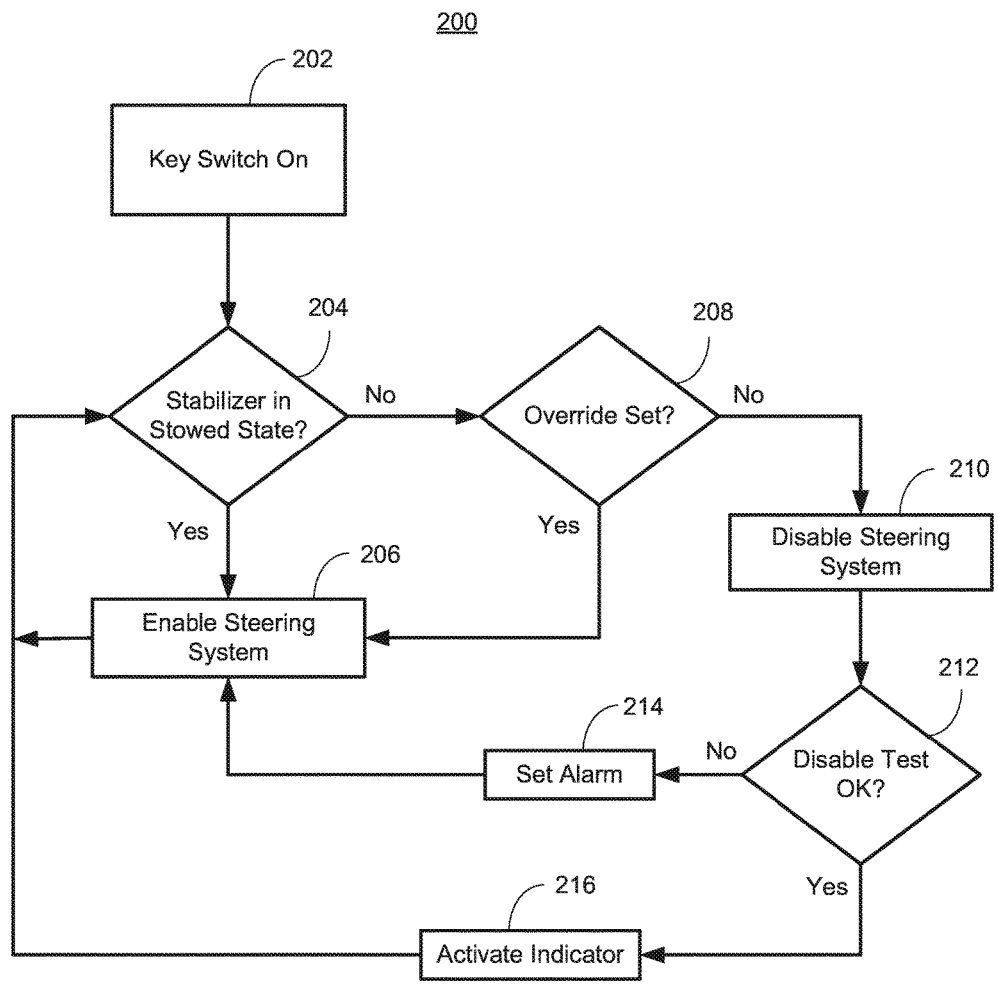
FIG. 7 is a flowchart for providing a steering interlock to the machine of FIG. 1 in accordance with the current disclosure.

A flowchart 200 for implementing a steering interlock is illustrated in FIG. 7. After the controller 154 determines that a key switch is on at block 202, execution continues at block 204. A determination is made, for example, at the controller 154, whether the stabilizer 148 is in the stowed state 128. If this is true, execution follows the "yes" branch to block 206 and the hydraulic steering circuit 136 is enabled as discussed above. If, at block 204, the controller 154 determines stabilizer 148 is in the unstowed state 130, the "no" branch is taken to block 208.

At block 208, a determination is made as to whether an override condition is set. In one embodiment, the override circuit 156 may include a switch (not depicted) set by an operator to allow tramming of the machine 100 even though the stabilizer 148 is in the unstowed state 130. The override circuit 156 may be read by the controller 154 and if the override set, or active, the "yes" branch from block 208 may be taken to block 206 and the hydraulic steering circuit 136 may be enabled. If, at block 208, the override is cleared, or inactive, the "no" branch may be taken from block 208 to block 210. Steering may be disabled at block 210 by depressurizing the hydraulic steering circuit 136 using the second valve 144 for the embodiment of FIG. 3 and the directional control valve 162 for the embodiments of FIGS. 5 and 6.

At block 212, a test may be conducted to determine if the hydraulic steering circuit 136 has been depressurized. This may be accomplished using a pressure sensor (not depicted) to determine whether pressure in the hydraulic steering circuit 136 is in an operating range. In one embodiment, the pressure in the hydraulic steering circuit 136 should be below 800 kpa after five seconds from when steering was disabled at block 210, for example. If, at block 212, the controller 154 determines that the steering is not disabled, the "no" branch may be followed to block 214 and an alarm may be set to notify an operator that the expected operating state is not active and that the operator should avoid operating a steering control and should consider service for the machine 100. If, at block 212, the disabled test passes, the "yes" branch may be taken from block 212 to block 216 where the indicator 160 is deactivated.

Among other things, the ability to disable steering for a machine 100 protects the machine 100 from damage that may be caused by inadvertent operation of conflicting hydraulic systems. In this case, damage to a stabilizer 148 may be avoided by disabling rotation of an articulated machine when the stabilizer 148 is deployed. For those circumstances when fully retracting the stabilizer 148 may be troublesome or time-consuming and an operator determines that such an action is not required, the operator is given the ability to set an override so that machine 100 may be trammed even though the stabilizer 148 not be fully retracted. This combination of features provides a level of safety for the machine 100 to prevent inadvertent damage while still offering the flexibility to move the machine 100 efficiently when required.

What is claimed is:

1. A machine comprising:
a front section having front wheels;
a rear section having rear wheels;
a pivot that couples the front section to the rear section;
a hydraulic steering circuit that moves the front section relative to the rear section about the pivot;
a stabilizer; and
a directional control valve that selectively depressurizes the hydraulic steering circuit according to a state of the stabilizer.

2. The machine of claim 1, wherein the stabilizer operates between a stowed state and an unstowed state, wherein the directional control valve depressurizes the hydraulic steering circuit when the stabilizer is in the unstowed state.

3. The machine of claim 1, wherein the stabilizer operates between a stowed state and a unstowed state, the machine further comprising an override circuit that clears an override condition, wherein the directional control valve depressurizes the hydraulic steering circuit only when the override condition is clear and the stabilizer is in the unstowed state.

4. The machine of claim 1, wherein the stabilizer is fully retracted in a stowed state and not fully retracted in a unstowed state, wherein the machine further comprises a sensor that provides data about a position of the stabilizer being in the stowed state or the unstowed state.

5. The machine of claim 4, further comprising a controller coupled to the sensor and the directional control valve, wherein the controller receives the data from the sensor to determine the state of the stabilizer and selectively depressurizes the hydraulic steering circuit by activating the directional control valve according to the state of the stabilizer.

6. The machine of claim 5, further comprising a hydraulic stabilizer circuit, wherein the sensor is a hydraulic pressure sensor configured to report a pressure spike associated with the stabilizer being fully retracted.

7. The machine of claim 5, wherein the sensor is one of a pressure sensor and an optical sensor that is configured to report when the stabilizer is fully retracted.

8. The machine of claim 5, further comprising an override circuit coupled to the controller, the override circuit used to clear or set an override condition, wherein the controller activates the directional control valve to depressurize the hydraulic steering circuit only when the override condition is clear and the stabilizer is in the unstowed state.

9. A steering interlock system in a machine comprising:
a pump that supplies pressurized hydraulic fluid;
a hydraulic stabilizer circuit including:
    a stabilizer cylinder coupled to the pump; and
    a stabilizer coupled to the stabilizer cylinder, the stabilizer operated between a stowed state and a unstowed state by the stabilizer cylinder; and
a hydraulic steering circuit including:
    a steering cylinder coupled to the pump, the steering cylinder configured to cause the machine to change a steering angle; and
    a directional control valve coupled between the pump and the steering cylinder, the directional control valve configured to selectively depressurize the hydraulic steering circuit responsive to the stabilizer being in the stowed state or the unstowed state.

10. The steering interlock system of claim 9, wherein the directional control valve selectively depressurizes the hydraulic steering circuit when the stabilizer is in the unstowed state.

11. The steering interlock system of claim 10, further comprising a sensor coupled to the hydraulic stabilizer circuit, the sensor providing data corresponding to the stabilizer being in the unstowed state.

12. The steering interlock system of claim 9, further comprising an override circuit, the override circuit causing the directional control valve to selectively maintain pressure in the hydraulic steering circuit when the override circuit is active.

13. The steering interlock system of claim 12, further comprising a controller coupled to the override circuit, the controller receiving a signal from the override circuit that causes the controller to selectively maintain pressure in the hydraulic steering circuit.

14. A method of operating an machine having a stabilizer, the method comprising:
    determining a state of the stabilizer to be in one of a stowed state and an unstowed state;
    enabling a hydraulic steering circuit of the machine when the stabilizer is in the stowed state; and
    disabling the hydraulic steering circuit of the machine when the stabilizer is in the unstowed state.

15. The method of claim 14, wherein determining the state of the stabilizer to be in the stowed state comprises determining that the stabilizer is in a fully retracted position.

16. The method of claim 14, wherein determining the stabilizer to be in the unstowed state comprises determining that the stabilizer is in any position other than a fully retracted position.

17. The method of claim 15, wherein determining the stabilizer is in the fully retracted position comprises receiving data from a sensor coupled to the stabilizer.

18. The method of claim 14, wherein enabling the hydraulic steering circuit comprises determining a state of an override circuit.

19. The method of claim 14, wherein disabling the hydraulic steering circuit of the machine comprises activating a directional control valve to depressurize the hydraulic steering circuit.

20. The method of claim 19, wherein activating the directional control valve to depressurize the hydraulic steering circuit comprises providing a signal from a controller that causes the directional control valve to depressurize the hydraulic steering circuit.

* * * * *